May 14, 1957 W. F. HUCK 2,792,194
MAGNETICALLY OPERATED VALVES
Filed July 29, 1953
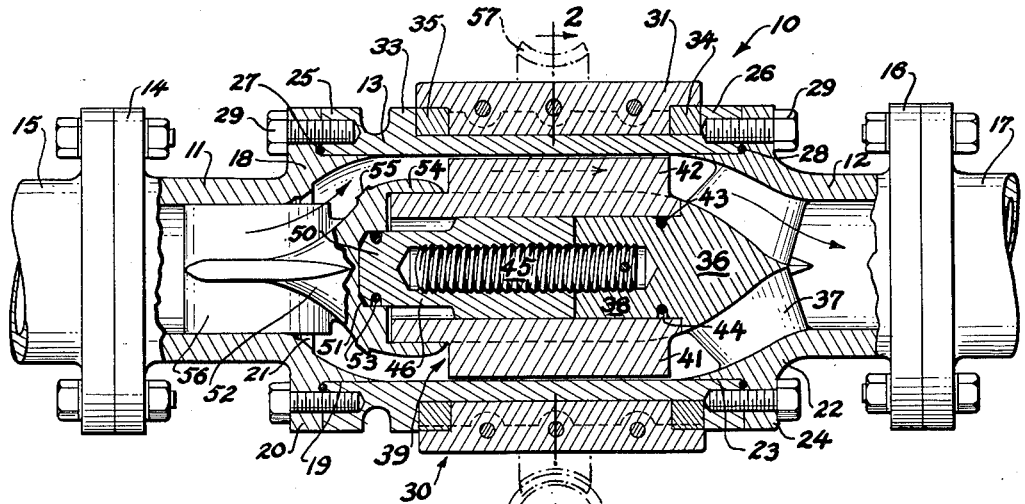
Fig.~1~
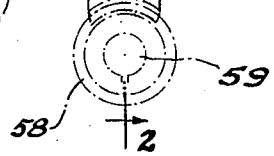
Fig.~3~
Fig.~2~
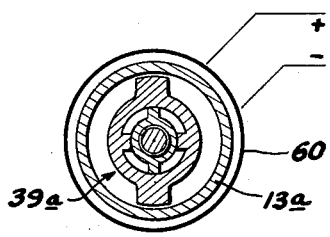
Fig.~4~
INVENTOR.
WILLIAM F. HUCK
BY Pollard and Johnston
ATTORNEYS United States Patent Office 2,792,194
Patented May 14, 1957

2,792,194

MAGNETICALLY OPERATED VALVES

William F. Huck, Forest Hills, N. Y.

Application July 29, 1953, Serial No. 370,944

10 Claims. (Cl. 251—65)

The present invention relates generally to valves, and is particularly directed to valves which are devoid of stuffing boxes, packings and the like normally required to prevent leakage of fluid past the valve stem or other valve operating member.

A general object of the present invention is to provide a valve of the described character wherein the valve opening or closing force is applied at the outside of the valve housing and is magnetically transmitted to the valve member within the housing so that there is no need to extend a valve stem, or other mechanical force transmitting member through the valve housing, and the conventional stuffing box or packings normally disposed around the valve stem can be eliminated.

A more specific object resides in the provision of a magnetically operated valve of the described character having mechanism within the valve housing for amplifying the force applied to the valve member in the opening and closing direction so that a relatively small magnetic force applied to that force amplifying mechanism is effective to provide a relatively large valve seating or unseating force.

Another specific object is to provide a magnetically operated valve of the described character which is constructed and arranged so that the flow passages through the valve embody only gradual changes in cross-sectional area and avoid any sudden or sharp flow direction changes thereby achieving a minimum resistance to flow through the valve.

Still another object is to provide a valve of the described character which is effective to produce a hammering action or series of intermittently applied impacts for tightly seating the valve member or for initially loosening the valve member after the latter has been tightly seated.

A further object is to provide a valve having the foregoing characteristics and which is compact in size, easy to install and economical in both construction and maintenance.

In accordance with one aspect of the invention a valve includes magnetic or electro-magnetic means disposed around the outside of the valve housing through which the fluid to be controlled flows and producing a rotating magnetic field penetrating to the interior of the housing to cause rotation of a driven magnetic member disposed wholly within the housing, with mechanical transmission means being operatively interposed between the driven magnetic member and the valve member and effective to convert the rotational movement of the driven magnetic member into axial movement of the valve member toward and away from a valve seat formed within the valve housing.

Further, in a valve embodying the present invention, the mechanical transmission means interposed between the driven magnetic member and the valve member may include a lost motion coupling permitting limited angular movement of the driven magnetic member independent of axial movement of the valve member so that, when axial movement of the latter is arrested, the driven magnetic member can oscillate under the influence of the rotating magnetic field to produce intermittent impacts within the transmission means for either tightly seating the valve member or loosening the valve member after it has been tightly seated.

It is still another aspect of the invention that the mechanical transmission means for converting rotational movement of the driven magnetic member into axial movement of the valve member may be completely contained or enclosed within the driven magnetic member and the valve member in all axial positions of the latter so that the flow passage through the valve housing may be devoid of any sharp or sudden changes in cross-sectional area or direction to present a minimum resistance to flow through the valve and thereby to provide increased efficiency in the operation of the valve.

The foregoing, and other objects, features and advantages of the present invention will be apparent in the following detailed description of illustrative embodiments thereof, which are presented merely by way of example, it being intended that such description should be read in connection with the accompanying drawing forming a part hereof, and wherein:

Fig. 1 is an axial sectional view of a valve embodying the present invention;

Fig. 2 is a transverse sectional view taken along the line 2—2 of Fig. 1;

Fig. 3 is a detail sectional view taken along the line 3—3 of Fig. 2; and

Fig. 4 is a schematic, transverse sectional view of a valve constructed in accordance with another embodiment of the present invention.

Referring to the drawings in detail, and initially to Figs. 1, 2 and 3 thereof, a valve embodying the present invention is there illustrated and generally identified by the reference numeral 10. The valve 10 includes a housing which is preferably non-magnetic and is formed of three parts including an entry section 11, a discharge section 12 and an intermediate section 13. The entry section 11 of the valve housing is substantially cylindrical in configuration and is formed with a radial flange 14 for connection to a similar or corresponding flange on the end of a pipe section 15 through which the fluid to be controlled is supplied. Similarly, discharge section 12 of the valve housing is substantially cylindrical in configuration and has a radial flange 16 at one end for connection to an outlet pipe section 17 receiving the fluid after control by the valve 10. The end of entry section 11 which is remote from the radial flange 14 terminates in an expanding portion 18 having a cylindrical outer surface 19 and an outwardly directed radial flange 20 bounding the surface 19 at one side. The internal surface of the expanding portion 18 is curved smoothly, as shown in Fig. 1, and a circular valve seat 21 is formed on the internal surface of the section 11 adjacent the narrow or small diameter end of its expanding portion. As seen in Fig. 1, discharge section 12 of the valve housing is also provided with an expanding portion 22 at the end thereof remote from flange 16, and expanding portion 22 is formed with a cylindrical outer surface 23 bounded at one side by an outwardly directed radial flange 24. The internal surface of section 12 is also formed with gradually curved contours to provide smooth flow of fluid from the large diameter end of expanding portion 22 to the relatively small diameter cylindrical part of section 12 communicating with pipe section 17.

The intermediate housing section 13 is substantially cylindrical in configuration and seats, at its opposite ends, upon the cylindrical outer surface portions 19 and 23 of housing sections 11 and 12, respectively. The intermediate section 13 is provided with outwardly directed, radial flanges 25 and 26 at its opposite ends, respectively, to abut against flanges 20 and 24 of sections 11 and 12, respectively. Suitable ring seals 27 and 28 are interposed between the confronting faces of flanges 20 and 25 and flanges 24 and 26, respectively, to prevent leakage of fluid through the joints between the several sections making up the valve housing, and bolts 29 extend axially through radial flanges 20 and 24 and are tapped into flanges 25 and 26 to hold the sections 11 and 12 on the opposite ends of the intermediate section 13.

The valve 10 embodying the present invention also includes means, generally identified by the reference numeral 30, positioned on the outside of intermediate housing section 13 and operative to produce a rotating magnetic field which penetrates the non-magnetic material of housing section 13. In the embodiment of the invention illustrated in Figs. 1, 2 and 3, the rotating magnetic field producing means 30 includes a cylindrical permanent magnet 31 which is preferably formed in two semi-cylindrical sections held together, at their adjacent edges, by suitable bolts 32 (Fig. 2). The two sections making up the permanent magnet 31 are arranged so that their like poles are disposed together at the adjacent edges, and these adjacent edges are enlarged inwardly to define pole pieces of opposite polarity at diametrically opposed locations within cylindrical permanent magnet 31. The permanent magnet 31 is rotatable on the cylindrical outer surface of intermediate housing section 13 between radial flange 26 and a third outwardly directed radial flange 33 provided on the section 13 (Fig. 1). Preferably, non-magnetic bearing rings 34 and 35 are interposed between cylindrical permanent magnet 31 and the outer surface of section 13 adjacent the flanges 26 and 33, respectively, to absorb the thrust and radial loads and to reduce frictional resistance to turning of permanent magnet 31 relative to the housing.

A supporting spider 36 is fixedly disposed within the expanding portion 22 of the discharge housing section, and is supported by suitably streamlined radial legs 37. The spider 36 includes a cylindrical extension 38 projecting axially into the intermediate section of the valve housing. A driven permanent magnet is disposed within the housing section 13 and is generally identified by the reference numeral 39. The driven permanent magnet 39 includes a hollow, substantially cylindrical body portion 40, which is rotatably fitted, at one end, on the outer cylindrical surface of extension 38, and outwardly directed radial projections 41 and 42 disposed at diametrically opposed locations on the body 40 and extending along a substantial portion of the length of the latter. The outer diameter of body portion 40 is substantially less than the inner diameter of intermediate section 13 of the valve housing so that an annular space is defined between the body portion 40 and housing section 13 to accommodate the fluid passing through the valve. The projections 41 and 42 extend into the above mentioned annular space, preferably with a longitudinally streamlined shape as indicated in Fig. 3, and they define pole pieces of opposite polarity on driven permanent magnet 39. While driven permanent magnet 39 is rotatable relative to the cylindrical extension 38 of the supporting spider 36, means are provided for preventing axial movement of the driven permanent magnet relative to its support. Such means may include chordal pins 43 carried by the body 40 and tangentially received in an annular groove 44 formed in the outer surface of cylindrical extension 38, as shown in Fig. 1 of the drawing.

A screw member 45 extends axially from the cylindrical extension 38 into the hollow body 40 of the driven magnet and is fixed relative to the extension 38. An elongated nut member 46 is loosely disposed within the hollow interior of the body portion 40 of the driven permanent magnet and is provided with a central, tapped blind bore which threadably receives the portion of the screw member 45 projecting axially from the cylindrical extension 38. It is apparent that rotation of the nut member 46 produces axial movement of the latter by reason of the threaded engagement of the screw member 45 within the tapped bore.

In order to effect rotation of nut member 46, the latter is provided with axial splines 48 on its outer surface for engagement with corresponding axial splines 49 (Fig. 2) formed on the internal surface of body portion 40 of the driven permanent magnet. Preferably, splines 48 and 49 are formed to permit limited rotation of the driven permanent magnet 39 relative to the nut member 46 prior to cooperative engagement of the splines 49 with the splines 48, for a reason hereinafter described in detail.

The nut member 46, at its end remote from the supporting spider 36, is formed with an axial bearing extension 50 which fits rotatably into a corresponding recess 51 provided in the back face of a suitably streamlined valve member 52. While nut member 46 is rotatable relative to valve member 52, suitable means are provided for axially coupling the valve member to the nut member, and such coupling means may consist of chordal pins 53 carried by valve member 52 and received tangentially within an annular groove in the outer surface of bearing extension 50, as shown in Fig. 1 of the drawing. The valve member 52 includes an annular skirt 54 extending axially from its back surface and slidably enclosing or telescoping over the adjacent cylindrical end portion of body portion 40 of the driven permanent magnet. The outer surface of valve member 52 is further formed with a circular seating face 55 for seating engagement with the valve seat 21, when the valve member is displaced axially towards the left, as viewed in Fig. 1. Radial vanes 56 preferably extend from the forward or nose end of the valve member 52 into the cylindrical portion of inlet housing section 11 to prevent swirling of the fluid as the latter enters into the valve 10.

The above described valve 10 operates as follows:

When the valve is in its fully opened position, as shown in Fig. 1, nut member 46 is threaded upon screw member 45 until its end face abuts against the confronting end face of cylindrical extension 38, and valve member 52 is correspondingly axially withdrawn from the valve seat 21. If permanent driving magnet 31 is then rotated, relative to the valve housing, in the direction in which nut member 46 needs to be rotated for removal from the screw member 45, poles 41 and 42 of the driven permanent magnet 39 are magnetically maintained adjacent to the pole pieces of opposite polarity of the driving magnet 31. Thus, the driven permanent magnet 39 within the valve housing follows the rotational movement of the driving permanent magnet 31 on the outside of the valve housing. After limited angular movement of driven permanent magnet 39, splines 49 of the latter engage corresponding splines 48 of nut member 46 to effect rotation of the latter, and the nut member is thereby threadably rotated relative to screw member 45 and is axially displaced in the direction toward the free end of the latter. Such axial movement of the nut member 46 causes its axial bearing extension 50 to bear against the bottom of recess 51 in valve member 52 and effects axial movement of the valve member in the direction toward the valve seat 21. When the driving permanent magnet 31 has been rotated a sufficient number of turns to seat the face 55 of the valve member against the valve seat 21, further rotation of the driving permanent magnet 31 interrupts the direct magnetic coupling provided between the driving magnet 31 and the driven magnet 39. However, such continued rotation of the driving magnet is operative, in a valve embodying the present invention, to effect tight seating of valve member 52 against seat 21. Since rotation of driven permanent magnet 39 is arrested, the poles of driving permanent magnet 31 are rotated out of radial alignment with respect to the poles of opposite polarity of driven permanent magnet 39. As the driving permanent magnet rotates through 180° independent of the driven magnet, the poles of the same polarity of the driving and driven permanent magnets become adjacent to each other, and pole pieces 41 and 42 of the driven magnet are repelled by the adjacent pole pieces of the driving magnet 31. Thus, the driven permanent magnet is rotated slightly in the direction opposed to the rotation of driving permanent magnet 31 to cause angular separation of the splines 48 and 49. As driving permanent magnet 31 continues to rotate and completes a full revolution independent of the driven permanent magnet, the poles of the driving permanent magnet again approach the poles of opposite polarity of the driven permanent magnet and magnetically attract the latter to cause the driven permanent magnet to follow the rotation of the driving permanent magnet through an angular displacement sufficient to drive splines 49 against splines 48. Thus, the continued rotation of driving permanent magnet 31 following initial seating of valve member 52 is effective to impose repeated and intermittent impacts against splines 48 on the nut member 46, and such impacts cause further tightening of the valve member against the seat 21. This impact producing feature of a valve construction embodying the present invention makes it possible to obtain tight seating of the valve member while employing a relatively small, magnetically transmitted valve operating force for effecting rotation of the driven permanent magnet. It should also be noted that impacts are provided in substantially the same manner for loosening a tightly seated valve member when the driving permanent magnet 31 is rotated in the opposite direction and rotation of the driven permanent magnet 39 is resisted by the frictional forces resulting from tight seating of the valve member 52 against the seat 21. After the valve member has been loosened, driven permanent magnet 39 follows the rotation of driving permanent magnet 31.

It is apparent that driving permanent magnet 31 may be rotated relative to the valve housing in any suitable manner. For example, as shown in broken lines on Fig. 1, a suitable worm gear 57 may be fixed upon the outer surface of the driving permanent magnet 31 and meshed with a worm 58 which is rotated by a driving shaft 59 connected to a conventional reversible electrical motor (not shown).

From Fig. 1 it can be seen that fluid, in flowing through the valve 10 embodying the present invention, follows a path which is devoid of any sharp or sudden changes in area or direction. As shown in Fig. 3, the pole pieces of driven permanent magnet 39 are streamlined longitudinally to offer the least possible resistance to the flow of the fluid through the valve. Further, skirt 54 of the valve member has an axial length sufficient to extend over the adjacent end of the body portion 40 of the driven permanent magnet in all positions of the valve member so that screw member 45 and nut member 46 are always enclosed and the irregularities of their configurations cannot affect the flow of fluid through the valve.

While a rotated permanent magnet 31 is employed in the embodiment of the invention illustrated in Figs. 1, 2 and 3 for the purpose of producing a rotating magnetic field, it is to be understood that other arrangements may be employed for that purpose. For example, as shown schematically in Fig. 4, a motor winding, 60, similar to that of a reversible squirrel cage motor, may be fixed upon the outside of the intermediate housing section 13a to generate an electro-magnetic rotating field. With the exception of the replacement of rotated driving permanent magnet 31 by motor winding 60 generating a rotating field, the valve of Fig. 4 is the same as that described above in connection with Figs. 1, 2 and 3, and the rotating magnetic field produced by the winding 60 coacts in a similar way with the driven permanent magnet 39a provided within the housing section 13a.

From the foregoing, it is apparent that valves embodying the present invention offer a minimum resistance to the flow of fluid therethrough and, by reason of the cooperative action of screw member 45 and nut member 46, are effective to apply a relatively large axial seating or unseating force to the valve member 52 in response to the imposition of a relatively small rotational force against driven permanent magnet 39. Further, by reason of the limited angular movement of driven permanent magnet 39 relative to nut member 46 permitted by the splines 48 and 49, a relatively small rotational force exerted by the rotating magnetic field is effective, in the manner described in detail hereinabove, to provide repeated intermittent impacts for either tightly seating the valve member 52 or for loosening the valve member after it has been tightly seated.

While illustrative embodiments of the present invention have been described in detail and shown in the accompanying drawing, merely by way of example, it is to be understood that the invention is not limited to these precise embodiments, and that various changes and modifications may be effected therein without departing from the scope or spirit of the present invention.

What is claimed is:

1. A valve comprising a valve housing having a valve seat therein, a valve member disposed in said housing and movable axially toward and away from a seated position against said seat, means on the outside of said housing operative to produce a rotating polarized magnetic field penetrating into the interior of said housing, driven magnetic means rotatable within said housing about an axis concentric with the axis of rotation of said magnetic field, said driven magnetic means having holes whereby it is rotated by said field, cooperating screw and nut elements disposed within said housing and coaxial with said driven magnetic means, one of said elements being rotatable and another being fixed against rotation and one of said elements being movable axially by relative rotation of said elements, means including a lost motion connection between said driven magnetic means and said rotatable screw element for effecting rotation of the latter, and means interconnecting said axially movable element and said valve member for effecting axial movement of the latter toward and away from said seated position so that a relatively large axial force is applied to said valve member in response to the application of a relatively small and magnetically transmitted torsional force to said driven magnetic means.

2. A valve according to claim 1; wherein said means operative to produce a rotating magnetic field includes a motor winding fixed on the outside of said housing and electrically generating a rotating polarized magnetic field.

3. A valve according to claim 1; wherein said means operative to produce a rotating magnetic field includes a driving permanent magnet rotatable on the outside of said housing and having poles to produce a polarized magnetic field which is rotated by rotation of said driving permanent magnet relative to said housing.

4. A valve comprising a magnetically permeable valve housing having a valve seat therein, a valve member disposed in said housing and movable axially toward and away from a seated position against said seat, means on the outside of said housing operative to produce a rotating polarized magnetic field penetrating into the interior of said housing, a driven permanent magnet rotatable within said housing about an axis concentric with the axis of rotation of said field, said driven magnet having poles whereby it is rotated by said field, and transmission means operatively interposed between said rotatable driven magnet and said valve member to effect displacement of the latter axially toward and away from said seated position in response to rotation of said driven magnet with said magnetic field, said transmission means including cooperating screw elements one of which is rotatable relative to another and is moved axially in response to its own rotation, cooperating means on said driven magnet and said rotatable element whereby the latter is driven by rotation of the former yet is movable axially relative to the former, and a rotatable connection between said rotatable element and said valve member whereby said rotatable element moves said valve member axially but is rotatable relative to said valve member.

5. A valve comprising a magnetically permeable valve housing having a valve seat therein, a valve member disposed in said housing and movable axially toward and away from a seated position against said seat, means on the outside of said housing operative to produce a rotating polarized magnetic field penetrating into the interior of said housing, a driven permanent magnet rotatable within said housing coaxially with said field, said driven magnet having poles whereby it is rotationally influenced by said field, means including driven and driving parts and operative to convert rotational movement of said driven part into axial movement of said driving part, means axially coupling said driving part to said valve member, and interengageable rotational coupling members on said driven magnet and on said driven part of the movement converting means to constrain said driven part to follow the rotation of said driven magnet while permitting limited angular displacement of the latter relative to said driven part so that, when said field continues to rotate and axial movement of said valve member is resisted by engagement with said seat, said driven magnet oscillates to repeatedly impact said rotational coupling members thereon against the rotational coupling members on said driven part.

6. A valve comprising a housing formed of a magnetically permeable material and having a cylindrical portion formed with a valve seat adjacent one end thereof, means on the outside of said cylindrical housing portion operative to produce a rotating polarized magnetic field penetrating into the interior of said housing and coaxial with the axis of said cylindrical housing portion, a streamlined supporting spider in said housing at the end of the latter remote from said valve seat, a driven permanent magnet extending axially in said cylindrical portion of the housing and rotatably mounted upon said supporting spider, said driven magnet having poles whereby it is rotationally influenced by said field, said driven magnet having an axially extending central bore therein, a fixed screw member extending axially from said supporting spider into said bore of the driven magnet, a nut member loosely disposed in said bore of the driven magnet and threadably engaging said screw member, a bearing extension on said nut member projecting axially from the latter and out of said bore of the driven magnet, a valve member formed to seat against said valve seat, means mounting said valve member on said bearing extension for axial movement with the latter, and interengageable rotational coupling members on said driven magnet and nut member within said bore of the driven magnet for transmitting rotational movement of said driven magnet to said nut member so that said screw member and said nut member cooperate to convert a relatively small rotational force magnetically applied to said driven magnet into a relatively large axial force applied to said valve member for displacing the latter toward and away from its seated position against said valve seat.

7. A valve according to claim 6; wherein said valve member has a central recess opening axially at the back face thereof and receiving said bearing extension of the valve member, and an axially extending skirt on the periphery of said valve member telescoping over the adjacent end portion of said driven magnet so that said screw member and nut member are enclosed in all positions of said valve member for minimizing resistance to the flow of a fluid through said housing.

8. A valve according to claim 6; wherein said driven magnet includes a cylindrical body portion having an outer diameter substantially smaller than the internal diameter of said cylindrical portion of the valve housing so that fluid can flow through the annular space defined between the outer and inner surfaces of said body portion and housing, respectively, and axially elongated pole pieces extending radially from said body portion into said annular space, said pole pieces being longitudinally streamlined to minimize their resistance to flow of fluid through said annular space.

9. A valve according to claim 6; wherein said rotational coupling members on said driven magnet include a plurality of axially extending and circumferentially spaced apart splines projecting radially inward from the surface of said bore, and said rotational coupling members on said nut member include a plurality of axially extending and circumferentially spaced apart splines projecting radially outward from said nut member within said bore into spaces defined between said splines on the driven magnet.

10. A valve according to claim 9; wherein the circumferential distances between the successive splines on said driven magnet are greater than the circumferential widths of said splines on the nut member, and the circumferential distances between the successive splines on said nut member are greater than the circumferential widths of said splines on the driven magnet so that said splines permit limited angular displacement of said driven magnet relative to said nut member and, when said field continues to rotate and axial movement of said valve member is resisted by engagement with said seat, said driven magnet oscillates and repeatedly impacts the splines thereon against said splines on the nut member.

References Cited in the file of this patent

UNITED STATES PATENTS

| | | |
|---|---|---|
| 2,289,574 | Carlson | July 14, 1942 |
| 2,589,188 | Craene | Mar. 11, 1952 |